US012691664B2

(12) United States Patent
Sugiyama et al.

(10) Patent No.: US 12,691,664 B2
(45) Date of Patent: Jul. 28, 2026

(54) WOODEN MATERIAL SHEET, WOODEN MATERIAL SHEET MANUFACTURING METHOD, MOLDING, AND MOLDING MANUFACTURING METHOD

(71) Applicant: Panasonic Intellectual Property Management Co., Ltd., Osaka (JP)

(72) Inventors: Tomonori Sugiyama, Osaka (JP); Kazuhiko Kaneuchi, Osaka (JP); Takeshi Kiritoshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 115 days.

(21) Appl. No.: 18/770,729

(22) Filed: Jul. 12, 2024

(65) Prior Publication Data

US 2024/0359436 A1 Oct. 31, 2024

Related U.S. Application Data

(63) Continuation of application No. PCT/JP2022/044279, filed on Nov. 30, 2022.

(30) Foreign Application Priority Data

Jan. 24, 2022 (JP) ................................. 2022-008750

(51) Int. Cl.
B32B 3/30 (2006.01)
B29C 45/14 (2006.01)
(Continued)

(52) U.S. Cl.
CPC ........ B32B 21/08 (2013.01); B29C 45/14008 (2013.01); B29C 45/14811 (2013.01);
(Continued)

(58) Field of Classification Search
CPC .. B32B 3/30; B32B 3/263; B32B 7/12; B32B 21/14
See application file for complete search history.

(56) References Cited

U.S. PATENT DOCUMENTS 6,352,784 B1     3/2002  Katagiri
2019/0100053 A1  4/2019  Kaneuchi et al.
(Continued)

FOREIGN PATENT DOCUMENTS

JP     11-070505      3/1999
JP     2006-110929    4/2006
(Continued)

OTHER PUBLICATIONS

International Search Report of PCT application No. PCT/JP2022/044279 dated Feb. 7, 2023.
(Continued)

*Primary Examiner* — Elizabeth E Mulvaney
(74) *Attorney, Agent, or Firm* — Wenderoth, Lind & Ponack, L.L.P.

(57) ABSTRACT

A wooden material sheet including: a wooden material made of natural wood; a thermoplastic shape conforming layer and a support layer disposed on one face of the wooden material; and a colored pattern layer, a second adhesive layer, and a first adhesive layer disposed on the other face of the wooden material.

19 Claims, 9 Drawing Sheets

(51) Int. Cl.

| | |
|---|---|
| *B32B 7/12* | (2006.01) |
| *B32B 21/08* | (2006.01) |
| *B32B 33/00* | (2006.01) |
| *B32B 37/06* | (2006.01) |
| *B32B 37/10* | (2006.01) |
| *B32B 37/12* | (2006.01) |
| *B32B 37/26* | (2006.01) |
| *B32B 38/00* | (2006.01) |
| *B29K 711/14* | (2006.01) |

(52) U.S. Cl.

CPC .................. *B32B 3/30* (2013.01); *B32B 7/12* (2013.01); *B32B 33/00* (2013.01); *B32B 37/06* (2013.01); *B32B 37/10* (2013.01); *B32B 37/1284* (2013.01); *B32B 37/26* (2013.01); *B32B 38/0036* (2013.01); *B32B 38/164* (2013.01); *B29K 2711/14* (2013.01); *B32B 2037/1253* (2013.01); *B32B 2037/268* (2013.01); *B32B 2038/0076* (2013.01); *B32B 2305/72* (2013.01); *B32B 2307/4026* (2013.01); *B32B 2307/7376* (2023.05); *B32B 2310/0831* (2013.01)

(56) References Cited

U.S. PATENT DOCUMENTS

| | | | | |
|---|---|---|---|---|
| 2020/0282702 A1* | 9/2020 | Sugiyama | ............... | B32B 37/06 |
| 2021/0162720 A1* | 6/2021 | Kaneuchi | ................. | B32B 3/30 |
| 2022/0111620 A1* | 4/2022 | Sugiyama | ............... | B32B 3/263 |

FOREIGN PATENT DOCUMENTS

| | | |
|---|---|---|
| JP | 2011-206998 | 10/2011 |
| JP | 2011-251412 | 12/2011 |
| JP | 2017-159583 | 9/2017 |
| JP | 2017-159584 | 9/2017 |
| JP | 2017-227018 | 12/2017 |
| JP | 2019-064168 | 4/2019 |
| JP | 2021-095737 | 6/2021 |

OTHER PUBLICATIONS

English Translation of Chinese Search Report issued Mar. 10, 2026 in the related Chinese Patent Application No. 202280089042.X.

* cited by examiner

TRANSFER LAYER 101

106    106    106

108
WOODEN
DECORATIVE
PANEL

102

103

104

101
TRANSFER LAYER

107 VENEER BONDING LAYER

108 HARD COAT LAYER

109 RELEASE LAYER

110 BASE FILM

WOODEN MATERIAL SHEET, WOODEN MATERIAL SHEET MANUFACTURING METHOD, MOLDING, AND MOLDING MANUFACTURING METHOD

TECHNICAL FIELD

The present disclosure relates to a wooden material sheet made of natural wood, a wooden material sheet manufacturing method, a molding, and a molding manufacturing method.

BACKGROUND ART

In recent years, there is an increasing need for decoration methods having a wide range of design expressions and high-quality designs due to diversification of customer orientation and recent orientation for authenticity and high quality in exterior parts of home appliances, in-vehicle interior parts, and the like. Among them, natural wood has a strong need from various fields, and is actively used as a decorative material. The decorative material such as natural wood is used as a high-class expression with an excellent design by providing users with the feel derived from the material such as appearance and tactile sensation. The decorative material referred to herein refers to a sheet-shaped material having a thickness of less than or equal to 6 mm. Meanwhile, when the above-described decorative material is applied to an exterior parts of home appliances, in-vehicle interior parts, and the like, a protective layer is generally formed on the surface of the material in order to ensure reliability as a product.

PTL 1 discloses a wooden decorative panel in which a protective layer is formed on a veneer by transfer. This configuration is illustrated in FIGS. 14 and 15.

Wooden decorative panel 108 in FIGS. 14 and 15 includes transfer layer 101, veneer 102, nonwoven fabric 103, and first adhesive layer 104. Transfer layer 101 is formed on release layer 105, and is transferred to one face of veneer 102 by heat press working to form irregularities 106 in a shape similar to a shape of surface irregularities of veneer 102. Furthermore, as illustrated in FIG. 15, hard coat layer 108 and veneer bonding layer 107 are formed as transfer layer 101 on release layer 109 of base film 110, and serve as the protective layer of the surface of veneer 102. Transfer layer 101 is a thin film, and thus, is configured to secure durability that can be used for industrial products while maintaining the original tactile sensation and appearance of veneer 102. Furthermore, veneer 102 is impregnated with a resin material as necessary.

CITATION LIST

Patent Literature

PTL 1: Unexamined Japanese Patent Publication No. 2019-64168

SUMMARY OF THE INVENTION

In general, in a wooden decorative panel using a natural veneer, handling of moisture contained in the veneer has not been considered much so far.

Furthermore, there is a case where the veneer is treated with a colored layer in order to express a color tone and a pattern. Further, a coating material used for forming the colored layer contains a coloring component and a solvent component, and the solvent component sometimes further contains a component whose boiling point is higher than the room temperature. Handling of the solvent component has not been considered so far.

Therefore, the present inventors have found handling related to the moisture of the veneer and the solvent component of the colored layer as a problem for further improvement, and have reached the present disclosure.

An object of the present invention is to provide a wooden material sheet capable of solving a problem related to moisture of a veneer and a solvent component of a colored layer.

A wooden material sheet according to the present disclosure includes: a wooden material made of natural wood; a thermoplastic shape conforming layer and a support layer disposed on one face of the wooden material; and a colored pattern layer, a second adhesive layer, a first adhesive layer, and a protective layer disposed on another face of the wooden material.

A wooden material sheet manufacturing method according to the present disclosure includes: laminating a thermoplastic shape conforming layer and a support layer on one face of a wooden material to obtain a laminate; forming a colored pattern layer and a second adhesive layer on another face of the wooden material of the laminate; bringing a first adhesive layer of a sheet in which a protective layer and the first adhesive layer are laminated into contact with the second adhesive layer of the laminate; and obtaining a wooden material sheet by thermocompression-bonding the sheet and the laminate.

A molding according to the present disclosure includes: the above-described wooden material sheet; and at least one member selected from the group consisting of a resin member, a metal member, a glass member, a ceramic member, and a wooden material, the member being disposed on a side of the wooden material sheet where the support layer is disposed.

A molding manufacturing method according to the present disclosure includes: disposing the above-described wooden material sheet in a fixed mold or a movable mold; injecting a resin into a cavity between the fixed mold and the movable mold; and curing the resin and then opening the fixed mold and the movable mold to take out a molding including the wooden material sheet.

A molding manufacturing method according to the present disclosure includes: preparing the above-described wooden material sheet; and bonding the wooden material sheet to a surface of at least one member selected from the group consisting of a resin member, a metal member, a glass member, a ceramic member, and a wooden material to obtain a molding.

With a configuration of the wooden material sheet according to the present disclosure, a desired color tone and a desired pattern can be expressed on the surface of the wooden material sheet and the second adhesive layer infiltrates and is cured to form a barrier layer so as to conform an uneven shape of the surface of the wooden material sheet. This makes it possible to suppress generation of air bubbles due to water vapor or a residual solvent during thermal processing.

DESCRIPTION OF EMBODIMENT

Figure 1:
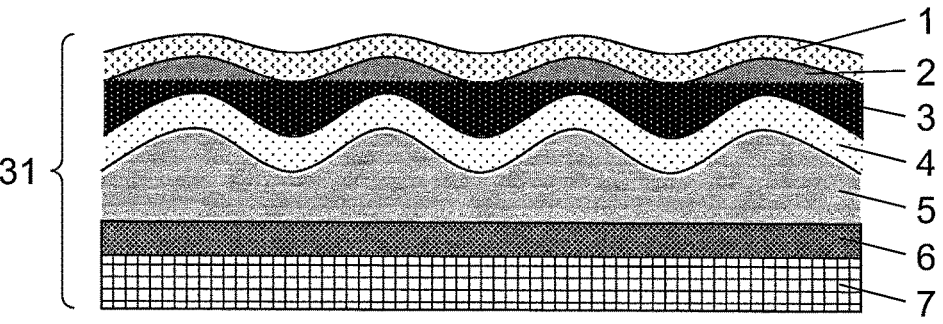
FIG. 1 is a cross-sectional view illustrating a cross-sectional structure of a wooden material sheet according to a first exemplary embodiment.

As a first aspect, a wooden material sheet includes a wooden material made of natural wood, a thermoplastic shape conforming layer and a support layer, which are disposed on one face of the wooden material, and a colored pattern layer, a second adhesive layer, a first adhesive layer, and a protective layer, which are disposed on another face of the wooden material, and has at least two or more adhesive layers including the first adhesive layer and the second adhesive layer.

As a second aspect, the wooden material sheet of the first aspect may include a base material layer on the other face of the wooden material or both the one face and the other face of the wooden material.

As a third aspect, in the wooden material sheet of the second aspect, the base material layer may be disposed to be closer to a surface side than the colored pattern layer when the wooden material is the center.

As a fourth aspect, in the wooden material sheet of any one of the first to third aspects, the second adhesive layer may be disposed to be closer to the surface side than the colored pattern layer when the wooden material is the center.

As a fifth aspect, in the wooden material sheet of any one of the first to fourth aspects, the second adhesive layer may be disposed to conform a shape of surface irregularities of the colored pattern layer or the wooden material.

As a sixth aspect, in the wooden material sheet of any one of the first to fifth aspects, each of the first adhesive layer and the second adhesive layer may have a crosslinking structure.

As a seventh aspect, in the wooden material sheet of any one of the first to sixth aspects, at least the first adhesive layer may contain an isocyanate-based curing agent and have a urethane bond.

As an eighth aspect, in the wooden material sheet of any one of the first to seventh aspects, each of the first adhesive layer and the second adhesive layer may have an average film thickness between 3 μm and 100 μm, inclusive.

As a ninth aspect, in the wooden material sheet of any one of the first to eighth aspects, the thermoplastic shape conforming layer or the support layer may have a color tone of the wooden material or a color tone similar thereto.

As a tenth aspect, a wooden material sheet manufacturing method includes: a step of laminating a thermoplastic shape conforming layer and a support layer on one face of a wooden material to obtain a laminate; a step of forming a colored pattern layer and a second adhesive layer on the other face of the wooden material of the laminate; and a step of thermocompression-bonding a sheet and the laminate with a first adhesive layer of the sheet facing the other face of the laminate to obtain a wooden material sheet, the sheet being obtained by laminating a protective layer and the first adhesive layer.

As an eleventh aspect, in the wooden material sheet manufacturing method of the tenth aspect, the sheet or the laminate may include a base material layer.

As a twelfth aspect, in the wooden material sheet manufacturing method of the tenth or eleventh aspect, the second adhesive layer in the laminate may be disposed to be closer to a surface side than the colored pattern layer when the wooden material is the center.

As a thirteenth aspect, in the wooden material sheet manufacturing method of any one of the tenth to twelfth aspects, in the thermocompression bonding step, the sheet may include a release layer, the protective layer, and the first adhesive layer disposed sequentially on a base film, the protective layer may have a total film thickness between 3 μm and 100 μm, inclusive, the protective layer may have a structure having at least a hard coat function, and the wooden material sheet manufacturing method may further include a peeling step of removing a release layer and a base film from the protective layer at an interface between the release layer and the protective layer after the thermocompression bonding step.

As a fourteenth aspect, in the wooden material sheet manufacturing method of any one of the tenth to thirteenth aspects, the colored pattern layer and the second adhesive layer may be formed on a surface of the wooden material using a processing process such as spray spraying, roll coater coating, or Sc printing.

As a fifteenth aspect, in the wooden material sheet manufacturing method of any one of the tenth to fourteenth aspects, the second adhesive layer may be formed on the surface of the wooden material and then cured using a process such as UV irradiation or thermal drying.

A molding of a sixteenth aspect includes: the wooden material sheet of any one of the first to ninth aspects; and at least one selected from the group consisting of a resin member, a metal member, a glass member, a ceramic member, and a wooden material, the member being disposed on a side of the wooden material sheet where the support layer is disposed.

A molding manufacturing method of a seventeenth aspect includes: a step of disposing the wooden material sheet of any one of the first to ninth aspects in a fixed mold or a movable mold; a step of injecting a resin into a cavity between the fixed mold and the movable mold; and a step of curing the resin and then opening the fixed mold and the movable mold to take out a molding including the wooden material sheet.

A molding manufacturing method of an eighteenth aspect includes: a step of preparing the wooden material sheet of any one of the first to ninth aspects; and a step of bonding the wooden material sheet to one surface of at least one selected from the group consisting of a resin member, a metal member, a glass member, a ceramic member, and a wooden material to obtain a molding.

Hereinafter, a wooden material sheet according to each exemplary embodiment of the present disclosure and a method for manufacturing the same, and a molding and a method for manufacturing the same will be described with reference to the accompanying drawings. Note that, in the drawings, substantially the same members are denoted by the same reference marks.

First Exemplary Embodiment

Figure 2:
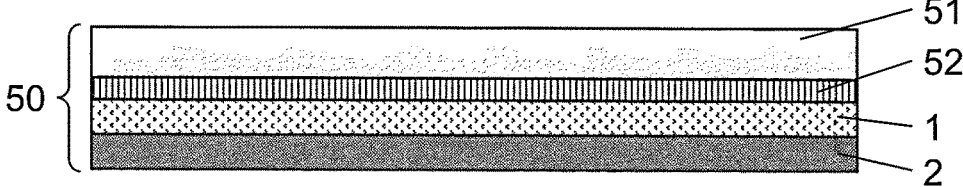
FIG. 2 is a cross-sectional view illustrating a cross-sectional structure of a transfer film for manufacturing the wooden material sheet according to the first exemplary embodiment.

FIG. 1 is a cross-sectional view illustrating a cross-sectional structure of wooden material sheet 31 according to a first exemplary embodiment of the present disclosure, and FIG. 2 illustrates a cross-sectional view illustrating a cross-sectional structure of transfer film 50.

As illustrated in FIG. 1, in wooden material sheet 31, protective layer 1, first adhesive layer 2, second adhesive layer 3, colored pattern layer 4, wooden material 5, thermoplastic shape conforming layer 6, and support layer 7 are formed in this order. When wooden material 5 is the center, wooden material sheet 31 includes wooden material 5 made of natural wood, thermoplastic shape conforming layer 6 and support layer 7 provided on one face of wooden material 5, and colored pattern layer 4, second adhesive layer 3, first adhesive layer 2, and protective layer 1 provided on the other face of wooden material 5.

Hereinafter, each member constituting wooden material sheet 31 will be described.

<Transfer Film>

Transfer film 50 includes release layer 52 formed on base film 51, and protective layer 1 and first adhesive layer 2 formed on release layer 52.

A side of transfer film 50 where "first adhesive layer 2" is disposed, a surface of wooden material 5 on a side where second adhesive layer 3 and colored pattern layer 4 are formed, and "thermoplastic shape conforming layer 6 and support layer 7" are laminated and integrated by thermocompression bonding, and release layer 52 and base film 51 are removed at an interface of protective layer 1, thereby manufacturing wooden material sheet 31.

Transfer film 50 may be produced as a continuous roll film or a single-wafer film, but productivity is higher when transfer film 50 is produced as the continuous roll film.

<Base Film>

Base film 51 is formed using a general film material such as a polyethylene terephthalate resin, an acrylic resin, or a polycarbonate resin, but is not limited thereto. An average thickness of base film 51 is preferably between 20 μm and 50 μm, inclusive. When base film 51 is thinner than 20 μm, base film 51 is easily wrinkled, broken, or warped and is difficult to handle due to thermal drying or the like in the course of forming each layer of transfer film 50. On the other hand, when base film 51 is thicker than 50 μm, conformity of transfer film 50 to wooden material 5 is deteriorated. Furthermore, when base film 51 is produced as a roll film, a total weight increases as a film thickness is thicker, and thus handling in carrying or the like is deteriorated, and the manufacturing cost also increases.

<Release Layer>

Release layer 52 has a role of peeling protective layer 1 and first adhesive layer 2 from transfer film 50. Release layer 52 is made of a thermosetting melamine resin, a two-component curable urethane resin, a thermosetting silicone resin, or the like. Note that the material is not necessarily limited to these materials as long as the same effect can be obtained. Any film thickness can also be selected as long as a peeling function can be obtained with the thickness. Furthermore, an additive, a filler, and the like that promote releasability can be added as necessary.

<Protective Layer>

Protective layer 1 has a structure having at least a hard coat function, and has a role of protecting wooden material 5. In addition to the hard coat function, other functionalities such as UV cut properties may be given at the same time. As the hard coat function, an ultraviolet curable acrylic resin of an after-cure type is generally used, but an ultraviolet curable acrylic resin of a precure type, a one-component type acrylic resin of a thermal drying type, a two-component curing type urethane acrylic resin of a thermal drying type, or an electron beam (EB) curing type acrylic resin may be used, and may be appropriately selected according to the application. As long as a desired effect can be obtained, it is not limited to materials and specifications other than those described above. Furthermore, when an after-cure type material is used, it is generally desirable to mold a wooden decorative panel and to irradiate the wooden decorative panel with ultraviolet rays or EB in the final step of peeling off base film 51 and release layer 52. The reason is that, when protective layer 1 is not completely cured at the time of molding wooden material sheet 31, protective layer 1 at the time of molding has good conformity and is less likely to be broken. However, it is not particularly limited to the final step, and the curing may be performed at an appropriate timing according to the application.

An average film thickness of protective layer 1 is between 3 μm and 100 μm, inclusive. A protective function of the surface of wooden material 5 is not sufficiently exhibited when the film thickness is thinner than 3 μm, and the conformity at the time of molding into a curved shape or the like is deteriorated when the film thickness exceeds 100 μm. Among them, it is desirable to form protective layer 1 to have a film thickness between 3 μm and 20 μm, inclusive. A distance to wooden material 5 becomes short, and it is possible to feel the original feel of wooden material 5 without feeling a sense of depth and glossiness in a case where a thick protective layer is applied by a general coating treatment. However, as long as a desired effect can be obtained, there is no problem even if the film thickness is out of the above range. Note that any functional layer such as a layer added with an additive such as a filler, a colored layer, or a pattern layer can also be combined and laminated as long as the layer can be formed using a general printing technique.

<First Adhesive Layer>

First adhesive layer 2 has a role of adhering to protective layer 1 and second adhesive layer 3. First adhesive layer 2 includes, as an adhesive main agent, a vinyl chloride copolymer resin, an olefin-based resin, a polyolefin-based resin, a urethane-based resin, an acryl-based resin, or the like, and forms a crosslinking structure in the layer. In first adhesive layer 2, an isocyanate-based curing agent is added as a curing agent, and a crosslinking structure of a urethane bond is formed as the adhesive main agent. First adhesive layer 2 can be formed by a known printing or coating method such as screen printing or a coater. An average film thickness of first adhesive layer 2 is between 3 μm and 100 μm, inclusive. When the film thickness is less than 3 μm, adhesiveness to second adhesive layer 3 is insufficient due to an insufficient adhesive thickness. On the other hand, even when the film thickness is larger than 100 μm, there is no influence on improvement of adhesiveness, and the manufacturing cost increases. The film thickness is preferably between 3 μm and 50 μm, inclusive, in order to enhance the conformity to the surface of wooden material 5. Note that first adhesive layer 2 may be formed on the surface of protective layer 1 a plurality of times in an overlapping manner in order to strengthen the adhesiveness to protective layer 1 and second adhesive layer 3 as long as the film thickness is within the above-described range.

<Second Adhesive Layer>

Second adhesive layer 3 has a role as a barrier layer on the surface of wooden material 5 on which colored pattern layer 4 is formed. Second adhesive layer 3 includes, as an adhesive main agent, a vinyl chloride copolymer resin, an olefin-based resin, a polyolefin-based resin, a urethane-based resin, an acryl-based resin, or the like, and has a crosslinking structure in the layer. Processes for forming the crosslinking structure include ultraviolet ray irradiation, EB irradiation, thermal curing, catalytic reaction, and the like, and any method may be used as long as a similar effect can be obtained by the process. Second adhesive layer 3 is formed on wooden material 5 on the surface on which colored pattern layer 4 is formed using a process such as spray spraying, roll coater coating, or inkjet coating. Coating in a liquid state is general, but it is not limited as long as a similar effect can be obtained in the form of a film or the like. Further, second adhesive layer 3 may be formed on a face of colored pattern layer 4 using a processing process of printing (screen printing, gravure printing, offset printing, flexographic printing, or the like).

An average film thickness of second adhesive layer 3 is between 3 μm and 100 μm, inclusive. When the film thickness is less than 3 μm, the role as the barrier layer is insufficient, and further, there is a high possibility that a portion subjected to an insufficient surface treatment is generated due to a large influence of surface irregularities derived from wooden material 5. On the other hand, even when the film thickness is larger than 100 μm, there is no influence on improvement of a function as the barrier layer, and the manufacturing cost increases. Further, when the film thickness is larger than 100 μm, the flexibility of wooden material 5 is lost due to a coating film of cured second adhesive layer 3, and the shapability of entire wooden material sheet 31 is deteriorated. In consideration of barrier properties and the shapability, the film thickness is particularly preferably between 3 μm and 60 μm, inclusive. Note that an adhesive component of second adhesive layer 3 may be similar to that of first adhesive layer 2, and any type may be used as long as the barrier layer can be formed on the surface of wooden material 5.

Figure 3:
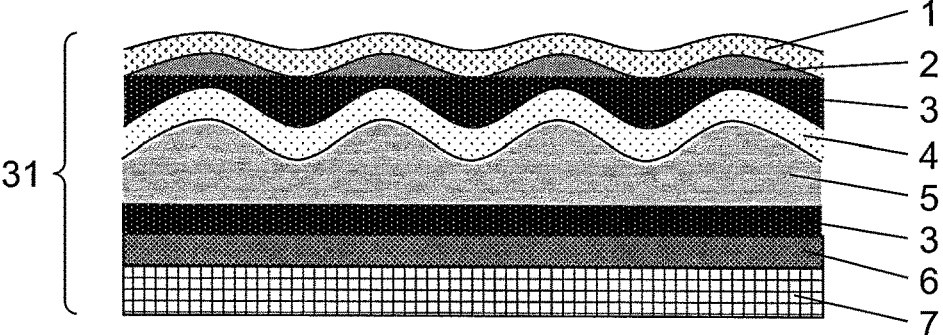
FIG. 3 is a cross-sectional view illustrating a cross-sectional structure of the wooden material sheet according to the first exemplary embodiment in which second adhesive layers are formed on both sides of a wooden material.

Further, as illustrated in FIG. 3, second adhesive layer 3 may be formed on both faces of wooden material 5. In this case, an effect as the barrier layer of wooden material 5 can be further enhanced. This makes it easier to release water vapor generated from wooden material 5 during a thermo-compression bonding step to an end face of wooden material 5.

<Colored Pattern Layer>

Colored pattern layer 4 is provided on at least one face of the surface of wooden material 5. For example, colored pattern layer 4 includes a known coloring pigment or dye as a colorant and if necessary, a vinyl chloride copolymer resin as a binder component, an olefin-based resin component, a polyolefin-based resin component, a urethane-based resin component, or an acryl-based resin component, and a diluent solvent. Furthermore, it is also possible to form a crosslinking structure on colored pattern layer 4 itself. As a result, the strength of colored pattern layer 4 itself is improved, and further, the adhesion with wooden material 5 is also improved. Processes for forming the crosslinking structure include ultraviolet ray irradiation, EB irradiation, thermal curing, and catalytic reaction, but are not limited thereto as long as the crosslinking structure can be formed.

Note that it is preferable that colored pattern layer 4 and second adhesive layer 3 are continuously formed. When colored pattern layer 4 and second adhesive layer 3 are continuously formed, the crosslinking structure of second adhesive layer 3 is also formed with colored pattern layer 4, and the adhesiveness of colored pattern layer 4 with respect to wooden material 5 can also be further strengthened.

Furthermore, colored pattern layer 4 can be formed using a known coloring process such as spray spraying, roll coater coating, inkjet coating, or a dipping treatment. By colored pattern layer 4, any color tone and any pattern can be formed according to a demand. Further, colored pattern layer 4 may be formed on a face of the wooden material 5 using a processing process of printing (screen printing, gravure printing, offset printing, flexographic printing, or the like).

<Wooden Material>

Wooden material 5 refers to a sheet-like plate material obtained by thinly slicing a material derived from natural wood, and an average plate thickness is between 0.1 mm and 3 mm, inclusive. When the plate thickness of wooden material 5 is less than 0.1 mm, wooden material 5 is too thin to be easily broken and difficult to handle in processing. On the other hand, when the plate thickness is more than 3 mm, wooden material 5 is too thick, and thus, it is difficult to perform sufficient shaping into a product shape. Furthermore, the functionality of wooden material 5 itself can also be imparted by a decoloring treatment or a treatment of a flame retardant to wooden material 5. Note that wooden material 5 referred to herein is not limited to pure natural wood, and also includes, for example, a sheet-like wooden plate obtained by laminating a plurality of natural wood sheets and performing a processing treatment. In addition, one having a sheet shape included in the above-described plate thickness range, such as artificial wood, parquet, a bamboo material, a cork sheet, and a sheet formed by solidifying a cellulose component similar to a wooden material, which are laminated and sliced to express any pattern, can be similarly used.

<Thermoplastic Shape Conforming Layer>

Thermoplastic shape conforming layer 6 has a role of adhering to wooden material 5 and support layer 7. Thermoplastic shape conforming layer 6 includes, for example, a thermoplastic component such as a vinyl chloride copolymer resin, an olefin-based thermoplastic component, a polyolefin-based thermoplastic component, a urethane-based thermoplastic component, or an acryl-based thermoplastic component, and is not limited to the above-described materials as long as the purpose of adhesion can be achieved. An average film thickness is between 50 μm and 200 μm, inclusive, and a sufficient adhesive force with respect to wooden material 5 and support layer 7 cannot be obtained due to an insufficient adhesive thickness when the film thickness is thinner than 50 μm. On the other hand, when the film thickness is thicker than 200 μm, there is no change in improvement of the adhesive force, and thus, the manufacturing cost increases.

<Support Layer>

Support layer 7 has a role of improving the strength of wooden material sheet 31 itself. Even when pressure is applied to wooden material sheet 31, support layer 7 buffers the deformation of wooden material sheet 31, so that wooden material sheet 31 is less likely to be damaged. A material, a thickness, and the like can be selected according to the application. Support layer 7 refers to, for example, a general polymer film made of polyethylene terephthalate, acrylic, or the like, a nonwoven fabric, or a mesh of a resin or metal. These materials may be used alone or in combination. When support layers 7 are used in combination, thermoplastic shape conforming layer 6 penetrates into a combined interface portion by setting a thickness of thermoplastic shape conforming layer 6 to be more than or equal to 100 μm, and thus, it is not always necessary to newly provide an adhesive layer for attaching combined support layers 7 to each other.

Note that, when wooden material 5 has a hole or a crack defect derived from the material, there is a possibility that such a defective portion has an appearance defect such as insufficient coloring of a color of the colored pattern layer. At that time, the defective portion can be made less noticeable by making a color tone of at least one of thermoplastic shape conforming layer 6 and support layer 7 similar to a color tone of colored pattern layer 4.

<Wooden Material Sheet Manufacturing Method>

Next, a manufacturing process of wooden material sheet 31 will be described with reference to FIGS. 4 to 8.

Figure 4:
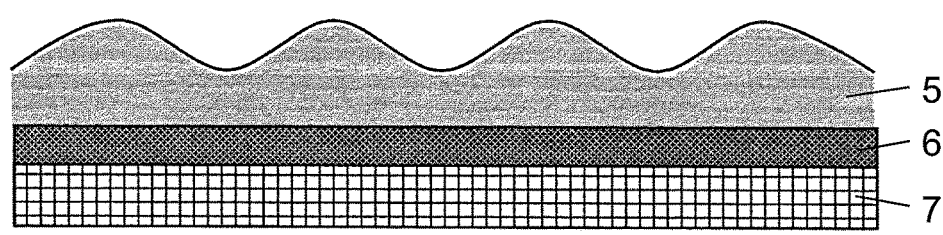
FIG. 4 is a cross-sectional view illustrating a cross-sectional structure of a configuration in which the wooden material, a thermoplastic shape conforming layer, and a support layer adhere to each other in the first exemplary embodiment.
Figure 5:
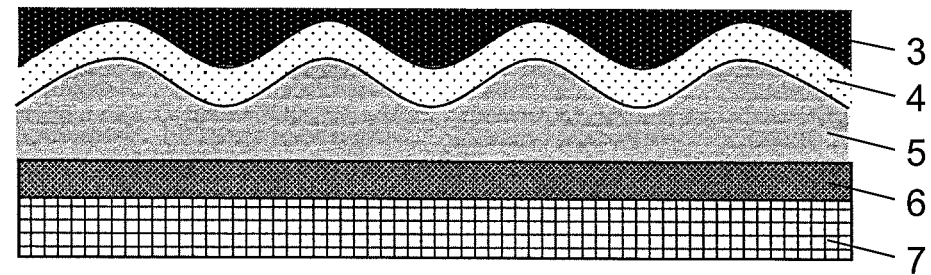
FIG. 5 is a cross-sectional view illustrating a cross-sectional structure of a configuration in which a colored pattern layer and the second adhesive layer are formed on a configuration in which the wooden material, the thermoplastic shape conforming layer, and the support layer adhere to each other in the first exemplary embodiment.
Figure 6:
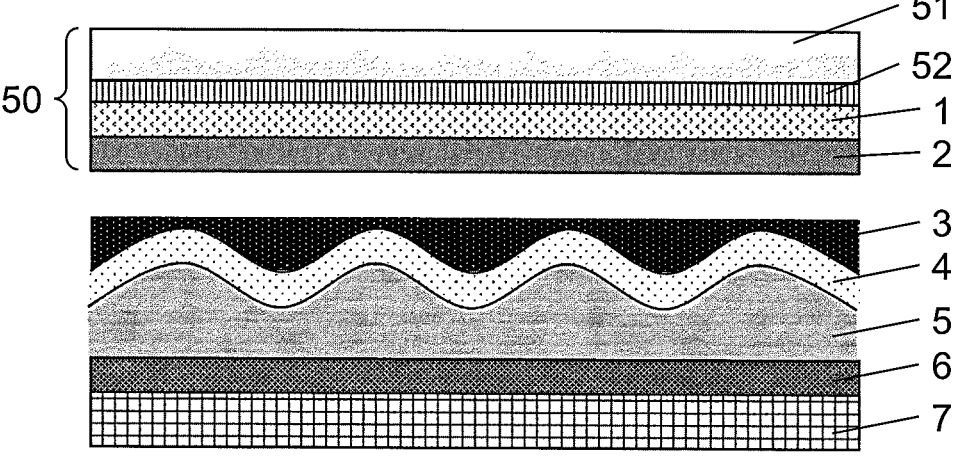
FIG. 6 is a cross-sectional view illustrating a cross-sectional structure of the wooden material sheet according to the first exemplary embodiment before a thermocompression bonding step.
Figure 7:
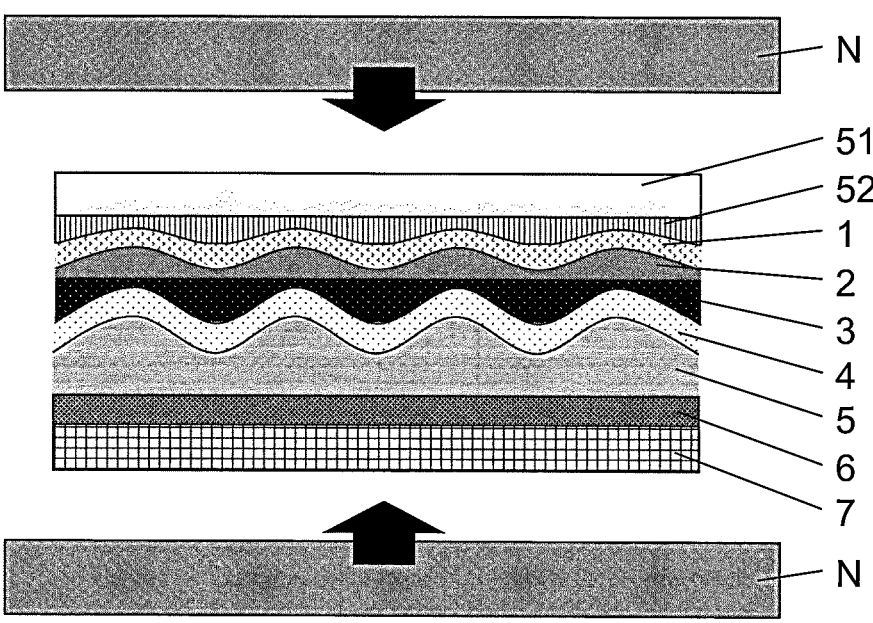
FIG. 7 is a cross-sectional view illustrating a cross-sectional structure of the wooden material sheet according to the first exemplary embodiment during the thermocompression bonding step.
Figure 8:
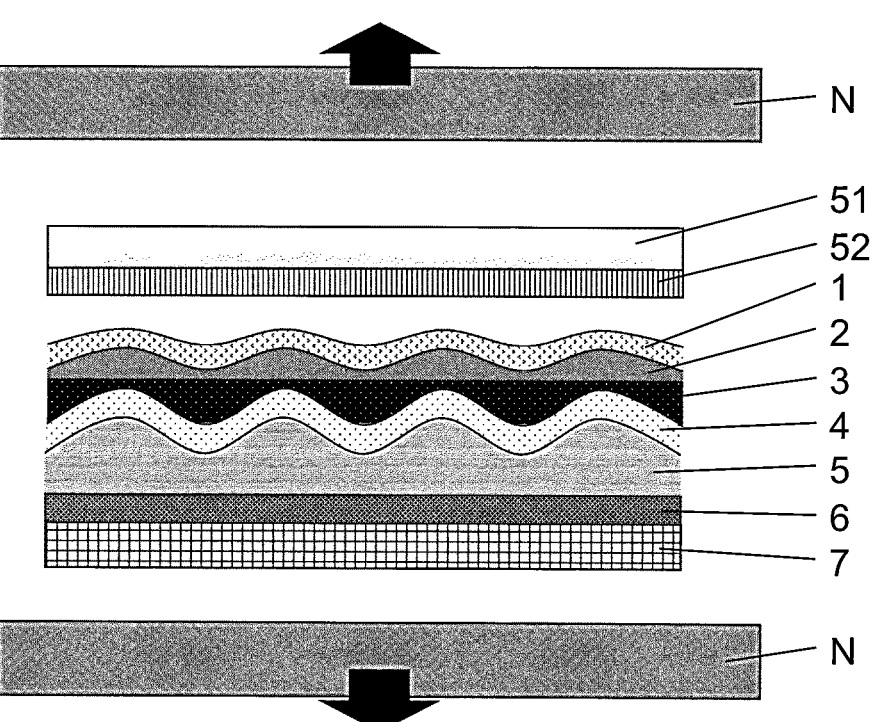
FIG. 8 is a cross-sectional view illustrating a cross-sectional structure of the wooden material sheet according to the first exemplary embodiment after the thermocompression bonding step.

FIG. 4 is a cross-sectional view illustrating a cross-sectional structure in a state in which support layer 7 is bonded to a back face of wooden material 5 with thermoplastic shape conforming layer 6 interposed therebetween. FIG. 5 is a cross-sectional view illustrating a step of forming colored pattern layer 4 and second adhesive layer 3 on the surface of wooden material 5 of FIG. 4. FIG. 6 is a cross-sectional view illustrating a cross-sectional structure before the thermocompression bonding step at the time of manufacturing wooden material sheet 31. FIG. 7 is a cross-sectional view illustrating a cross-sectional structure during the thermocompression bonding step at the time of manufacturing wooden material sheet 31. FIG. 8 is a cross-sectional view illustrating a cross-sectional structure of wooden material sheet 31 after the thermocompression bonding step.

(1) FIG. 4 illustrates a state in which support layer 7 is bonded to any one face of wooden material 5 with thermoplastic shape conforming layer 6 interposed therebetween using a device capable of applying heat and pressure such as hot pressing before colored pattern layer 4 and second adhesive layer 3 are formed on the surface of wooden material 5. As a result, wooden material 5 itself is less likely to be broken, and at the same time, is brought into a firm sheet state, so that the handleability at the time of processing colored pattern layer 4 and second adhesive layer 3 described above can be improved. Note that, when there is no problem in the handleability of wooden material 5 itself, it is not always necessary to bond support layer 7 to any one face of wooden material 5 with thermoplastic shape conforming layer 6 interposed therebetween first, and the respective members may be independently laminated and integrated in a step of FIG. 7 to be described later.

(2) In FIG. 5, colored pattern layer 4 and second adhesive layer 3 have been formed on the surface of wooden material 5 in advance before thermocompression bonding of wooden material sheet 31. As described above, after colored pattern layer 4 is formed, second adhesive layer 3 is formed on the surface thereof, and second adhesive layer 3 is cured. At that time, treatment is performed using a curing process suitable for types of the adhesive main agent and the added curing agent, such as thermal curing or UV curing. As a result, a coating film having a crosslinking structure is formed on the surfaces of colored pattern layer 4 and wooden material 5. Note that a coating film can be formed by performing treatment using a similar process when second adhesive layer 3 is formed on both faces of wooden material 5. At this time, second adhesive layer 3 may be formed and cured on one side of wooden material 5, and then, second adhesive layer 3 may be formed and cured on the other side, or second adhesive layer 3 may be formed on both the faces of wooden material 5 at a time by dipping or the like and cured.

(3) Before the thermocompression bonding step in FIG. 6, first adhesive layer 2 of transfer film 50 is laminated so as to be in contact with a surface side on which second adhesive layer 3 is formed.

(4) In FIG. 7, the laminate of FIG. 6 is thermocompression-bonded by thermocompression bonding device N, so that first adhesive layer 2 that has been thermally melted adheres to second adhesive layer 3. At this time, water vapor is generated from the inside of wooden material 5, and a solvent component remaining in colored pattern layer 4 is volatilized, but the water vapor and the solvent component easily escape from not a side where protective layer 1 and first adhesive layer 2 is disposed but the end face of wooden material 5 since the coating film of cured second adhesive layer 3 is formed on the surface. Furthermore, when second adhesive layer 3 is formed on both the faces of wooden material 5, the water vapor and the volatilized residual solvent more easily escape from the end face of wooden material 5 described above.

(5) FIG. 8 illustrates a state in which wooden material sheet 31 in which the respective layers adhere to each other is manufactured by thermocompression bonding using thermocompression bonding device N, and a side where base film 51 is disposed and a side where wooden material sheet 31 is disposed are separated at an interface between protective layer 1 and release layer 52 after the thermocompression bonding step. Since second adhesive layer 3 suppresses volatile components of the water vapor and the residual solvent generated during the thermocompression bonding step, wooden material sheet 31 having no appearance defect accompanied by air bubbles on the side where protective layer 1 and first adhesive layer 2 are disposed is obtained. Note that FIG. 8 illustrates the state where a side where release layer 52 and base film 51 are disposed is separated from wooden material sheet 31, but release layer 52 and base film 51 can be removed between any steps. That is, they may be immediately after the thermocompression bonding step or can also be kept in the state of being integrated with wooden material sheet 31 without being removed.

With these configurations, it is possible to suppress the appearance defect accompanied by air bubbles generated at the time of the thermocompression bonding step described above.

Second Exemplary Embodiment

Figure 9:
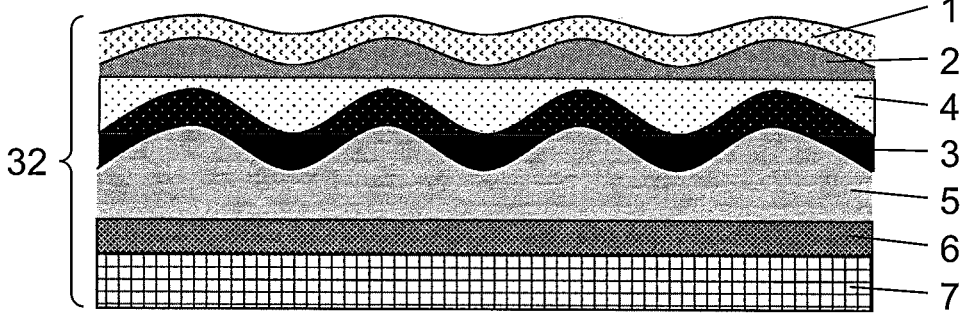
FIG. 9 is a cross-sectional view illustrating a cross-sectional structure of a wooden material sheet according to a second exemplary embodiment.

FIG. 9 is a cross-sectional view illustrating a cross-sectional structure of wooden material sheet 32 according to a second exemplary embodiment. Note that those having similar functions as those of the first exemplary embodiment will be denoted by the same reference marks. In the second exemplary embodiment, wooden material sheet 32 is configured by sequentially providing second adhesive layer 3 and colored pattern layer 4 on a surface of wooden material 5 on a side opposite to support layer 7, and then, attaching and integrating protective layer 1 and first adhesive layer 2 by a thermocompression bonding step similar to that of the first exemplary embodiment. Since second adhesive layer 3 is directly provided on the surface of wooden material 5, water vapor generated from wooden material 5 can be effectively released toward a side face of wooden material 5. Furthermore, colored pattern layer 4 can be formed directly on a surface of second adhesive layer 3, and colored pattern layer 4 can be disposed in a state of being closer to the outermost side of protective layer 1. Therefore, the texture of colored pattern layer 4 can be clearly emphasized.

Meanwhile, there is a possibility that a solvent component included in a material of colored pattern layer 4 becomes a residual solvent to cause an appearance defect accompanied by air bubbles after wooden material sheet 32 is formed. Therefore, it is preferable to perform a drying process of removing the residual solvent by forced drying such as thermal drying after colored pattern layer 4 is formed. However, in a case where a solvent component whose volatilization is sufficiently promoted in an environment at the room temperature under the atmosphere is used, the drying process is not necessarily required, and it is a process that can be arbitrarily controlled on a manufacturer side as long as the purpose of reducing the amount of the residual solvent is achieved. Note that second adhesive layer 3 may be installed on both faces of wooden material 5 as in the first exemplary embodiment.

With the configuration of the second exemplary embodiment, it is possible to realize wooden material sheet 32 capable of clearly emphasizing the texture of colored pattern layer 4 by adding the drying process as necessary while leaving a function of releasing the water vapor, generated from wooden material 5, through an end portion of wooden material 5.

Third Exemplary Embodiment

Figure 10A:
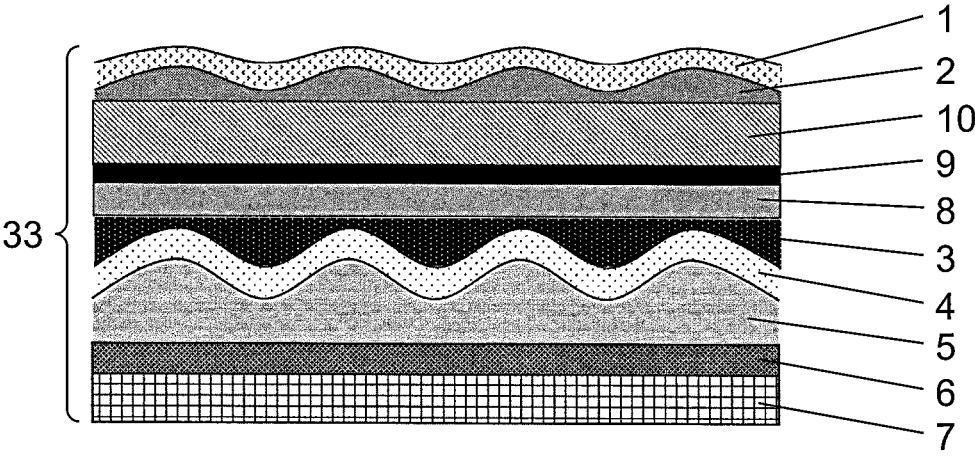
FIG. 10A is a cross-sectional view illustrating a cross-sectional structure of a wooden material sheet according to a third exemplary embodiment.
Figure 10B:
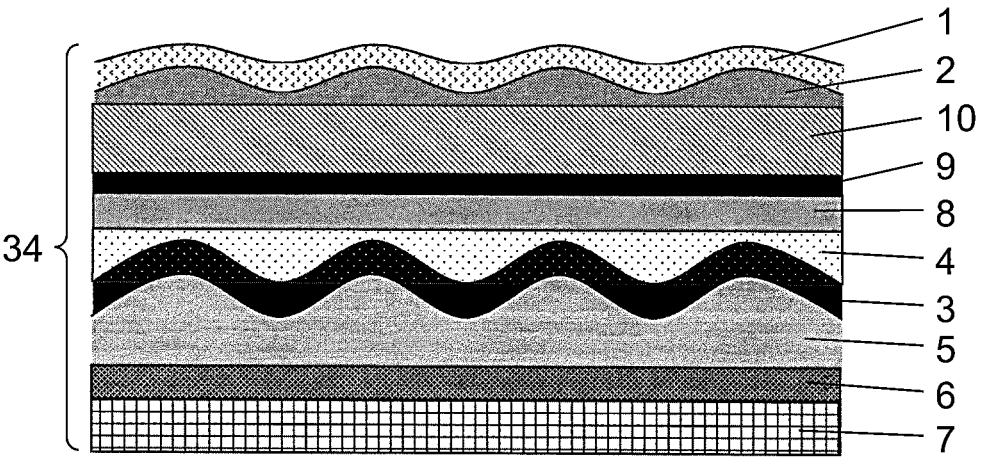
FIG. 10B is a cross-sectional view illustrating a cross-sectional structure of the wooden material sheet according to the third exemplary embodiment.

FIG. 10A is a cross-sectional view illustrating a cross-sectional structure of wooden material sheet 33 according to a third exemplary embodiment, and FIG. 10B is a cross-sectional view illustrating a cross-sectional structure of wooden material sheet 34 according to the third exemplary embodiment. Note that those having similar functions as those of the first or second exemplary embodiment will be denoted by the same reference marks. Wooden material sheet 33 described in the third exemplary embodiment is formed in a configuration in which base material layer 10 provided with thermoplastic adhesive layer 8 and primer layer 9 on one side or both sides is sequentially laminated on a surface of second adhesive layer 3 on a side where protective layer 1 is disposed, which constitutes the first exemplary embodiment, and then, the laminate is integrated by a thermocompression bonding step similar to that of the first exemplary embodiment.

Furthermore, wooden material sheet 34 is formed in a configuration in which base material layer 10 provided with thermoplastic adhesive layer 8 and primer layer 9 on one side or both sides is sequentially laminated on a surface of colored pattern layer 4 on a side where protective layer 1 is disposed, which constitutes the second exemplary embodiment, and then, the laminate is integrated by a thermocompression bonding step similar to that of the first exemplary embodiment.

<Thermoplastic Adhesive Layer>

Thermoplastic adhesive layer 8 is provided for the purpose of attaching base material layer 10 to second adhesive layer 3 or colored pattern layer 4. As a component, a thermoplastic component such as a vinyl chloride copolymer resin, an olefin-based thermoplastic component, a polyolefin-based thermoplastic component, a urethane-based thermoplastic component, or an acryl-based thermoplastic component is used, and it is not limited to the above-described materials as long as the purpose of adhesion can be achieved. An average film thickness is between 3 μm and 200 μm, inclusive, and a sufficient adhesive force cannot be obtained due to an insufficient adhesive thickness when the average film thickness is thinner than 3 μm. On the other hand, when the film thickness is thicker than 200 μm, there is no change in improvement of the adhesive force, and thus, the manufacturing cost increases. The film thickness is more preferably between 20 μm and 120 μm, inclusive.

<Primer Layer>

Primer layer 9 has a role of firmly attaching base material layer 10 to thermoplastic adhesive layer 8 or first adhesive layer 2, and is provided on one face or both faces of base material layer 10. For example, if thermoplastic adhesive layer 8 or first adhesive layer 2 is an acrylic adhesive, selection in consideration of compatibility can be performed, for example, by providing primer layer 9 having the same acrylic component. Furthermore, it is possible to improve the film strength of primer layer 9 itself by forming a crosslinking structure such as a urethane bond in primer layer 9, or to form a crosslinking structure with each of thermoplastic adhesive layer 8 and first adhesive layer 2 if thermoplastic adhesive layer 8 and first adhesive layer 2 have similar components, and thus, an interlayer adhesive force itself can be greatly improved. Note that primer layer 9 is not necessarily provided when thermoplastic adhesive layer 8 or first adhesive layer 2 can be firmly attached directly to base material layer 10.

<Base Material Layer>

Base material layer 10 has a role as a barrier layer that prevents water vapor from wooden material 5 and a residual solvent derived from colored pattern layer 4 from flowing out toward protective layer 1. As a material, for example, a general-purpose polymer film generally used as an industrial product, such as polyethylene terephthalate, polycarbonate, acrylic, or polyolefin, is used. Base material layer 10 does not need to include only one kind of component, and may be subjected to a treatment in combination with another substance such as easy adhesive coating on one side or both sides thereof. Furthermore, base material layer 10 may be subjected to a treatment for enhancing a design or a functionality. For example, in the case of the design, printing of a pattern, material coloring of base material layer 10 itself, and the like are exemplified. In the case of the functionality, an electronic circuit having an infrared (IR) cut function or an ultraviolet (UV) cut function or formed directly on base material layer 10 using a conductive material. As described above, it is sufficient for base material layer 10 to achieve the original purpose of base material layer 10, that is, the role as the barrier layer that prevents the water vapor from wooden material 5 and the residual solvent derived from colored pattern layer 4 from flowing out toward protective layer 1. In addition, various designs or functionalities can be imparted to base material layer 10 without limiting other designs or functionalities. Further, the designs or functionalities may be imparted not only to one face but also to both faces of base material layer 10. Thereby, functionalities and added value of wooden material sheet 33 or wooden material sheet 34 itself can be enhanced. Further, since base material layer 10 is provided, wooden material 5 can be deformed integrally with base material layer 10 when wooden material sheet 33 or wooden material sheet 34 is deformed by pressing or the like. Therefore, the stress applied to wooden material 5 can be relaxed, and the moldability of wooden material sheet 33 or wooden material sheet 34 itself can be improved. Note that second adhesive layer 3 may be installed on both faces of wooden material 5 as in the first and second exemplary embodiments.

Figure 11A:
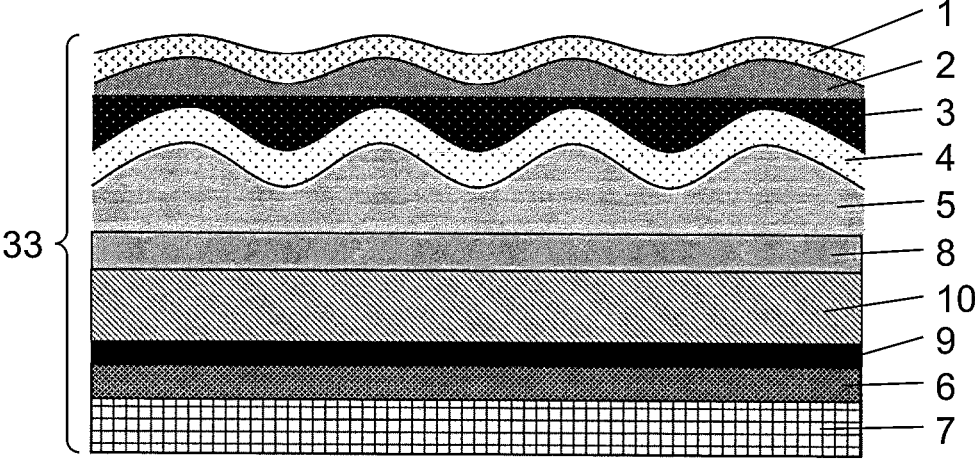
FIG. 11A is a cross-sectional view illustrating a cross-sectional structure of the wooden material sheet according to the third exemplary embodiment when a base material layer is installed on a back face of a wooden material.
Figure 11B:
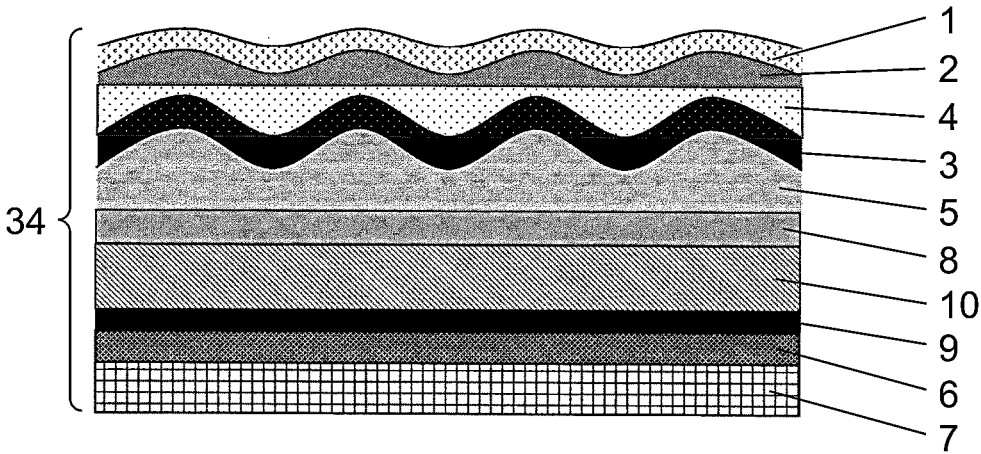
FIG. 11B is a cross-sectional view illustrating a cross-sectional structure of the wooden material sheet according to the third exemplary embodiment when the base material layer is installed on the back face of the wooden material.

Incidentally, base material layer 10 may be provided on a back face or both faces of wooden material 5 as illustrated in FIGS. 11A, 11B, 12A, and 12B. FIGS. 11A and 11B illustrate a configuration in which base material layer 10 is provided between wooden material 5 and thermoplastic shape conforming layer 6. In this case, the above-described moldability can be improved by adding base material layer 10 to the configuration illustrated in FIG. 1 or 9.

Figure 12A:
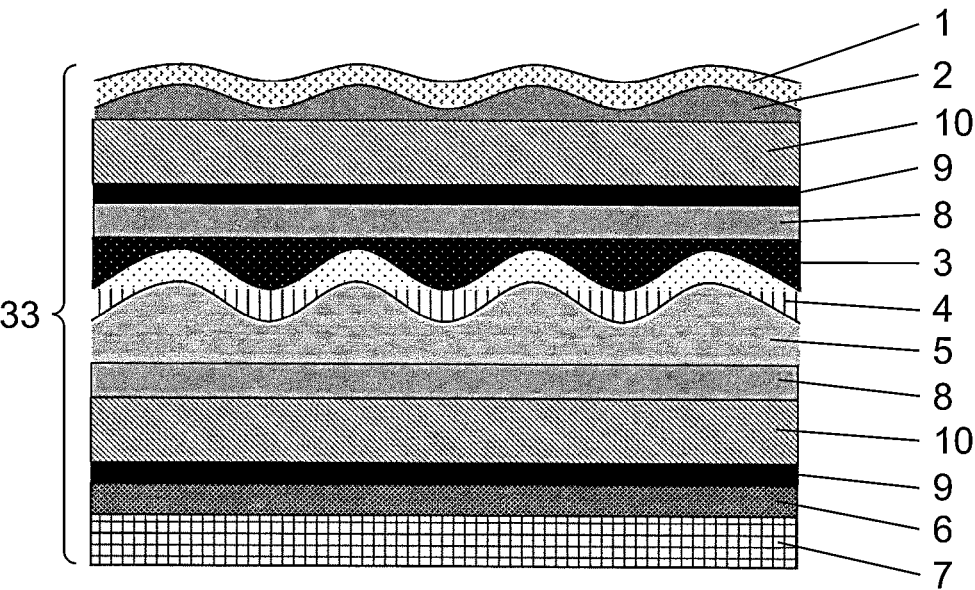
FIG. 12A is a cross-sectional view illustrating a cross-sectional structure of the wooden material sheet according to the third exemplary embodiment when the base material layers are installed on both sides of the wooden material.
Figure 12B:
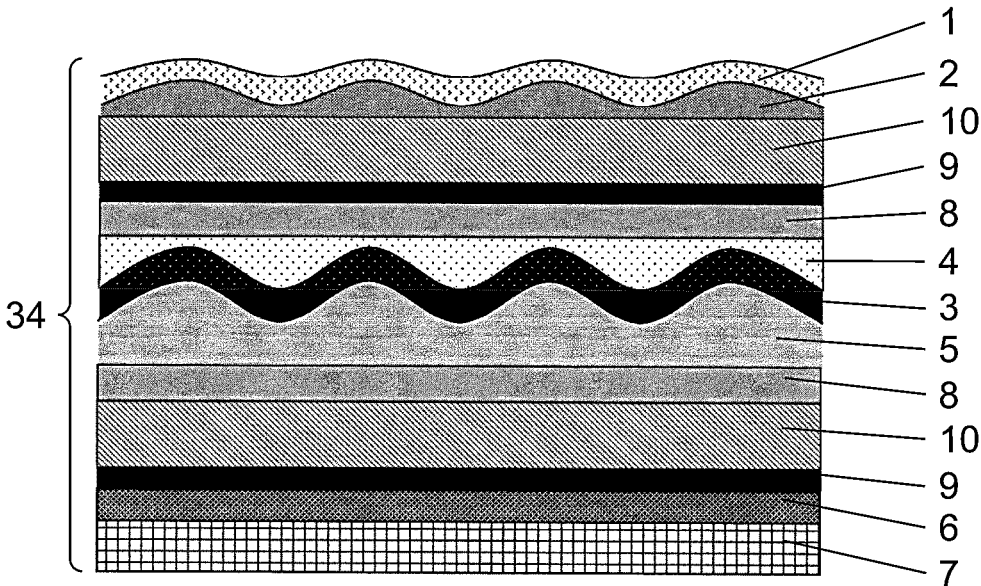
FIG. 12B is a cross-sectional view illustrating a cross-sectional structure of the wooden material sheet according to the third exemplary embodiment when the base material layers are installed on both the sides of the wooden material.

On the other hand, FIGS. 12A and 12B illustrate a configuration in which base material layers 10 (first base material layer 10 and second base material layer 10) are provided on both the faces of wooden material 5. In this case, an effect of reducing an appearance defect accompanied by air bubbles can be further enhanced by adding base material layer 10 to the configuration illustrated in FIG. 10A or 10B. Note that the base material layers 10 installed on both sides of wooden material 5 illustrated in each of FIGS.

12A and 12B are not necessarily made of the same material. Any combination is possible according to the application.

Since base material layer 10 is provided as described above, it is possible to further reduce the appearance defect accompanied by air bubbles due to water vapor derived from wooden material 5 and a residual solvent generated from colored pattern layer 4 as compared with the configurations of the first and second exemplary embodiments.

Fourth Exemplary Embodiment

Figure 13A:
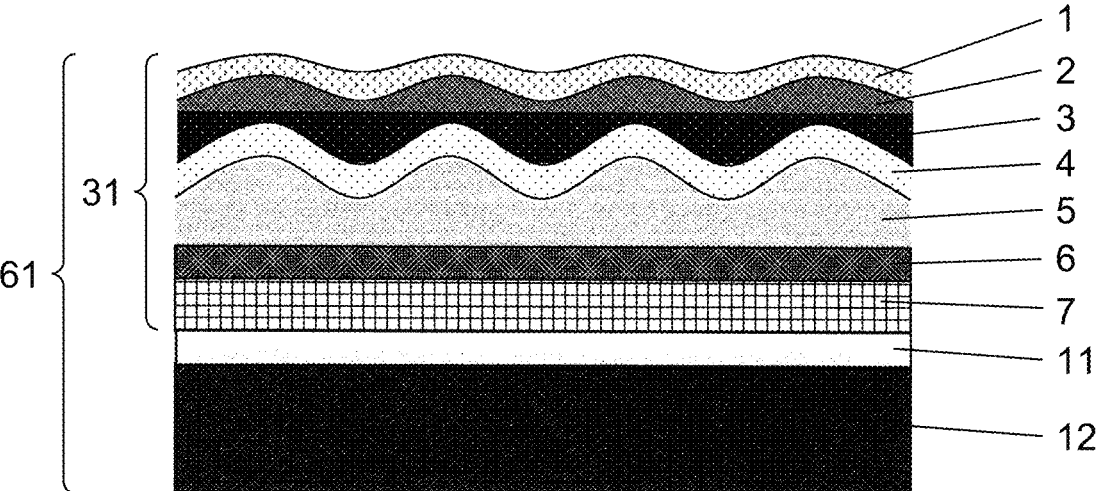
FIG. 13A is a cross-sectional view illustrating a cross-sectional structure of a molding using a wooden material sheet according to a fourth exemplary embodiment.
Figure 13B:
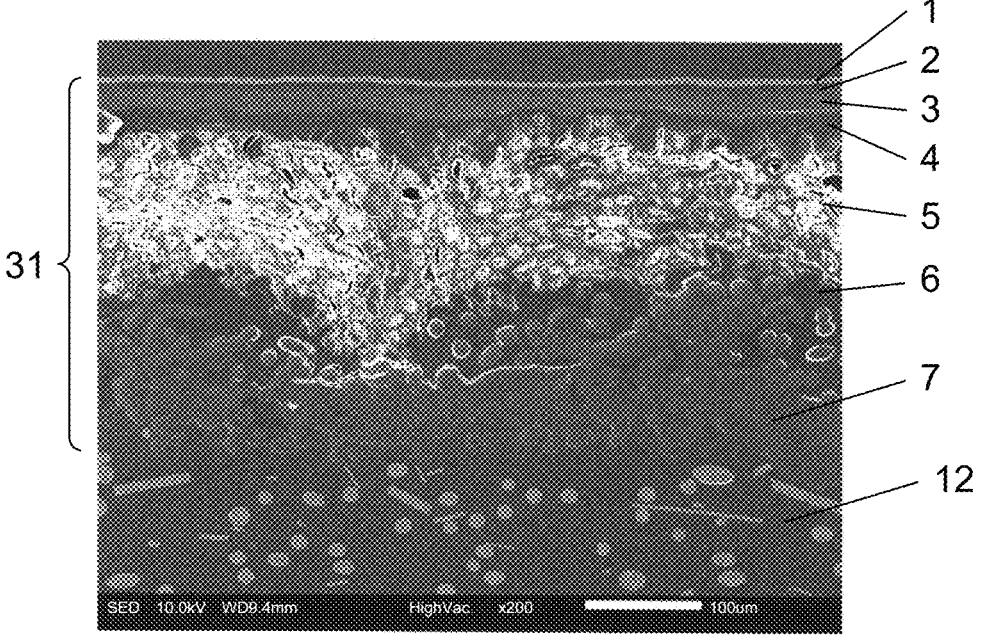
FIG. 13B is a partially enlarged SEM image of a cross section of the molding.
Figure 14:
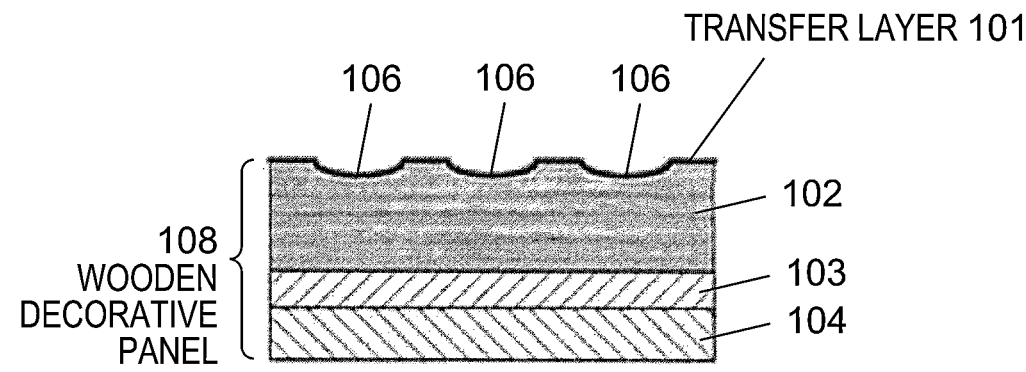
FIG. 14 is a cross-sectional view illustrating a cross-sectional structure of a wooden decorative molding of PTL 1.
Figure 15:
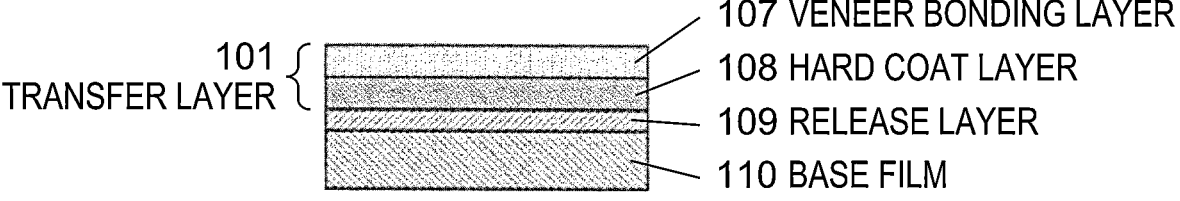
FIG. 15 is a cross-sectional view illustrating a cross-sectional structure of a transfer film of PTL 1.

FIG. 13A is a cross-sectional view illustrating a cross-sectional structure of molding 61 according to a fourth exemplary embodiment, and FIG. 13B is a partially enlarged SEM image of a cross section of molding 61. FIG. 13A is configured as molding 61 in which third adhesive layer 11 and reinforcing layer 12 are provided on a rear face of support layer 7 constituting wooden material sheet 31.

Wooden material sheet 31 can be bonded as a single sheet like a wall paper, but can also be integrated with reinforcing layer 12 by vacuum pressure molding, insert molding, or the like.

<Third Adhesive Layer>

Third adhesive layer 11 has an average film thickness between 1 μm and 100 μm, inclusive, may have a liquid or sheet shape, and may be made of a thermoplastic adhesive or a thermosetting adhesive without being limited as long as the purpose of adhering to support layer 7 and the reinforcing layer 12 can be achieved.

<Reinforcing Layer>

A material of reinforcing layer 12 can be selected according to the application. For example, when an injection molding machine is used, an injected resin can be integrated with wooden material sheet 31 by being attached to third adhesive layer 11 on a back face of support layer 7. Examples of a resin that can be used as the injected resin include a general-purpose resin for molding such as a PMMA resin, an ABS resin, a PS resin, or a PC resin. In addition, it is also possible to cope with a resin that requires molding at a high temperature, such as a resin for the optical application or a super engineering resin. On the other hand, reinforcing layer 12 prepared in another step may be integrated with wooden material sheet 31 using a process such as hand bonding or vacuum pressure molding. As reinforcing layer 12 prepared in another step, a resin housing, a metal member, a glass member, a ceramic member, a wooden material, or the like processed by cutting can be selected according to the required application. A material of third adhesive layer 11 may be selected according to each material.

Note that FIG. 13A illustrates a configuration in which third adhesive layer 11 is formed. However, as illustrated in the SEM image of FIG. 13B, when third adhesive layer 11 is integrated with support layer 7 by an injection molding machine using a member having a fiber layer such as a nonwoven fabric, an anchor effect is generated as an injected resin enters gaps between fibers, thereby enabling adhesion and integration. Therefore, it is not always necessary to form third adhesive layer 11. Note that both FIGS. 13A and 13B illustrate molding 61 in a state in which release layer 52 and base film 51 are not illustrated, but the present invention is not limited thereto. For example, the integration may be performed using wooden material sheet 31 in a state in which release layer 52 and base film 51 are attached or in a state in which the both are removed in advance. Further, wooden material sheet 31 is taken as an example in FIGS. 13A and 13B, but the present invention is not limited thereto. For example, each of wooden material sheet 32, wooden material sheet 33, and wooden material sheet 34 respectively described in the second to third exemplary embodiments can also be integrated with reinforcing layer 12 by a process similar to that described in the fourth exemplary embodiment.

It is sufficient for a molding to include, for example, the above-described wooden material sheet and at least one selected from the group consisting of a resin member, a metal member, a glass member, a ceramic member, and a wooden material disposed on a support layer side of the wooden material sheet.

The molding may be formed, for example, by injection molding using the above-described wooden material sheet. Specifically, the molding may be manufactured by the respective steps as follow.

(a) The above-described wooden material sheet is disposed in a fixed mold or a movable mold.

(b) A resin is injected into a cavity between the fixed mold and the movable mold.

(c) After the resin is cured, the fixed mold and the movable mold are opened, the molding including the wooden material sheet is taken out.

Furthermore, the molding may be manufactured by the following steps.

(i) The wooden material sheet is prepared.

(ii) The wooden material sheet is bonded to at least one surface selected from the group consisting of a resin member, a metal member, a glass member, a ceramic member, and a wooden material to form the molding.

The present disclosure includes an appropriate combination of any exemplary embodiment or example among the various above-described exemplary embodiments or examples, and effects of each of the exemplary embodiments or examples can be achieved.

INDUSTRIAL APPLICABILITY

The wooden material sheet according to the present disclosure contributes to advanced functions and advanced designs in fields requiring decoration such as the exterior of various household electrical appliances and the in-vehicle interior.

REFERENCE MARKS IN THE DRAWINGS

1 protective layer
2 first adhesive layer
3 second adhesive layer
4 colored pattern layer
5 wooden material
6 thermoplastic shape conforming layer
7 support layer
8 thermoplastic adhesive layer
9 primer layer
10 base material layer
11 third adhesive layer
12 reinforcing layer
31 wooden material sheet
32 wooden material sheet
33 wooden material sheet
34 wooden material sheet
50 transfer film
51 base film
52 release layer
61 molding

The invention claimed is:

1. A wooden material sheet comprising:
    a wooden material made of natural wood;
    a thermoplastic shape conforming layer and a support layer disposed on one face of the wooden material; and
    a colored pattern layer, a second adhesive layer, a first adhesive layer, and a protective layer disposed on another face of the wooden material.

2. The wooden material sheet according to claim 1, further comprising a first base material layer disposed on the other face of the wooden material.

3. The wooden material sheet according to claim 2, further comprising a second base material layer disposed on the one face of the wooden material.

4. The wooden material sheet according to claim 2, wherein the first base material layer is disposed to be closer to a surface side than the colored pattern layer when the wooden material is a center.

5. The wooden material sheet according to claim 1, wherein the second adhesive layer is disposed to be closer to a surface side than the colored pattern layer when the wooden material is a center.

6. The wooden material sheet according to claim 1, wherein the second adhesive layer is disposed to conform a shape of surface irregularities of the colored pattern layer or the wooden material.

7. The wooden material sheet according to claim 1, wherein each of the first adhesive layer and the second adhesive layer has a crosslinking structure.

8. The wooden material sheet according to claim 1, wherein the first adhesive layer contains an isocyanate-based curing agent and has a crosslinking structure of a urethane bond.

9. The wooden material sheet according to claim 1, wherein each of the first adhesive layer and the second adhesive layer has an average film thickness between 3 μm and 100 μm, inclusive.

10. The wooden material sheet according to claim 1, wherein the thermoplastic shape conforming layer or the support layer has a color tone of the wooden material or a color tone similar to the color tone of the wooden material.

11. A wooden material sheet manufacturing method comprising:
    laminating a thermoplastic shape conforming layer and a support layer on one face of a wooden material to obtain a laminate;
    forming a colored pattern layer and a second adhesive layer on another face of the wooden material of the laminate;
    bringing a first adhesive layer of a sheet in which a protective layer and the first adhesive layer are laminated into contact with the second adhesive layer of the laminate; and
    obtaining a wooden material sheet by thermocompression-bonding the sheet and the laminate.

12. The wooden material sheet manufacturing method according to claim 11, wherein the sheet or the laminate includes a base material layer.

13. The wooden material sheet manufacturing method according to claim 11, wherein the second adhesive layer of the laminate is disposed to be closer to a surface side than the colored pattern layer when the wooden material is a center.

14. The wooden material sheet manufacturing method according to claim 11, further comprising peeling a release layer and a base film from the protective layer at an interface between the release layer and the protective layer after the obtaining the wooden material sheet, wherein the sheet includes the base film and the release layer, and in the obtaining the wooden material sheet, the release layer, the protective layer, and the first adhesive layer are disposed sequentially on the base film, and the protective layer has a total film thickness between 3 μm and 100 μm, inclusive, and the protective layer has a structure having at least a hard coat function.

15. The wooden material sheet manufacturing method according to claim 11, wherein the colored pattern layer and the second adhesive layer are disposed on the other face of the wooden material using any processing process among spray spraying, roll coater coating, screen printing, gravure printing, offset printing, and flexographic printing.

16. The wooden material sheet manufacturing method according to claim 11, wherein the second adhesive layer is disposed on a surface of the wooden material and then cured using any process of UV irradiation and thermal drying.

17. A molding comprising:

the wooden material sheet according to claim 1; and at least one member selected from the group consisting of a resin member, a metal member, a glass member, a ceramic member, and a wooden material, the member being disposed on a side of the wooden material sheet where the support layer is disposed.

18. A molding manufacturing method comprising:

disposing the wooden material sheet according to claim 1 in a fixed mold or a movable mold;

injecting a resin into a cavity between the fixed mold and the movable mold; and curing the resin and then opening the fixed mold and the movable mold to take out a molding including the wooden material sheet.

19. A molding manufacturing method comprising:

preparing the wooden material sheet according to claim 1; and bonding the wooden material sheet to a surface of at least one member selected from the group consisting of a resin member, a metal member, a glass member, a ceramic member, and a wooden material to obtain a molding.

\* \* \* \* \*